United States Patent [19]

Verbeek et al.

[11] Patent Number: 4,712,037
[45] Date of Patent: Dec. 8, 1987

[54] RESONANT PIEZOELECTRIC SENSOR

[75] Inventors: Pieter W. Verbeek, Nootdorp; Theodorus A. Klaase, Voorburg; Arne Theil, Delft, all of Netherlands

[73] Assignee: Nederlandse Centrale Organisatie Voor Toegepast-Natuurwetenschappelijk Onderzoek, The Hague, Netherlands

[21] Appl. No.: 879,213

[22] Filed: Jun. 26, 1986

[30] Foreign Application Priority Data

Jul. 3, 1985 [NL] Netherlands ................ 8501908

[51] Int. Cl.$^4$ .................................... H01L 41/08
[52] U.S. Cl. ............................... 310/323; 310/321; 310/328; 310/338; 310/366; 310/800; 310/334; 73/28; 73/702
[58] Field of Search ................ 310/334–337, 310/327, 338, 800, 322, 321, 312, 323, 328, 366; 73/624–629, 632, 642, 644, 29–30, 32 A, 38, 862.59, 862.58, DIG. 4, 702, 597

[56] References Cited

U.S. PATENT DOCUMENTS

| 2,625,035 | 1/1953 | Firestone | 310/336 X |
|---|---|---|---|
| 2,875,354 | 2/1959 | Harris | 310/336 X |
| 3,187,207 | 6/1965 | Tomes | 310/325 |
| 3,472,063 | 10/1969 | Branson | 73/67.1 |
| 4,101,865 | 7/1978 | Schurr | 310/336 X |
| 4,166,967 | 9/1979 | Benes | 310/330 |
| 4,234,813 | 11/1980 | Iguchi et al. | 310/366 |
| 4,242,912 | 1/1981 | Burckhardt et al. | 310/334 X |
| 4,354,132 | 10/1982 | Borburgh et al. | 310/334 |
| 4,356,422 | 10/1982 | Van Maanen | 310/334 X |
| 4,383,194 | 5/1983 | Ohigashi et al. | 310/327 X |
| 4,394,773 | 7/1983 | Ruell | 310/800 X |
| 4,427,912 | 1/1984 | Bui et al. | 310/800 X |
| 4,546,658 | 10/1985 | Rocha et al. | 310/338 X |
| 4,550,606 | 11/1985 | Drost | 310/334 X |
| 4,555,953 | 12/1985 | Dario et al. | 310/800 X |
| 4,600,855 | 7/1986 | Strachan | 310/321 X |
| 4,634,917 | 1/1987 | Dvorsky et al. | 310/366 X |

FOREIGN PATENT DOCUMENTS

| 0142178 | 5/1985 | European Pat. Off. |
| 2736102 | 2/1978 | Fed. Rep. of Germany . |
| 2746712 | 4/1978 | Fed. Rep. of Germany . |
| 3309234 | 9/1984 | Fed. Rep. of Germany . |

OTHER PUBLICATIONS

Article "The Strong Piezoelectricity in PVDF", published in *Ultrasonics* for Jan. 1976.

*Primary Examiner*—Mark O. Budd
*Attorney, Agent, or Firm*—Brumbaugh, Graves, Donohue & Raymond

[57] ABSTRACT

A sensor for generating a signal in response of a variation at the tactile face. The sensor comprises superposed transmitting and receiving layers, which are provided with electrodes for the supply and pick-up of electrical signals to the transmitting layer and from the receiving layer respectively. With a high acoustic impedance of the boundary medium adjacent to the transmitting layer and a low acoustic impedance of the boundary medium adjacent to the receiving layer or vice versa, the sum of the thicknesses of the transmitting and receiving layers is an odd number of v/4f. With similar impedances, either low or high, of the said boundary media the aforesaid sum is an even number of v/4f. v is the propagation velocity of the acoustic vibration in the material of the transmitting and receiving layers and f the frequency of the signal supplied.

14 Claims, 10 Drawing Figures

FIG. 1   FIG. 2
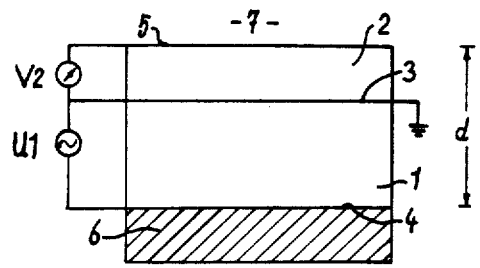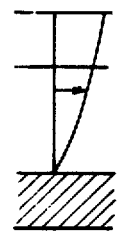
FIG. 6
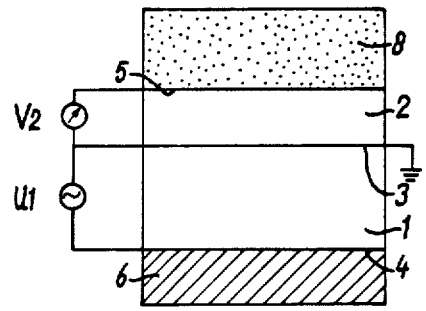
FIG. 7
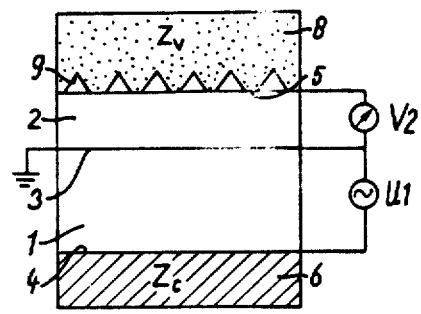

RESONANT PIEZOELECTRIC SENSOR

The invention relates to a sensor comprising a transmitting layer and a receiving layer disposed thereon of piezoelectric material, which are provided with electrodes for the supply and pick-up of electrical signals to the transmitting layer or from the receiving layer respectively. A transducer with a transmitting and receiving layer of this type is known from the U.S. Pat. No. 4,356,422.

In said transducer the transmitting layer consists of a ceramic material with piezoelectric properties. The receiving layer, on the other hand, consists of a piezoelectric polymer. In the transmitting phase an acoustic wave is emitted by the transmitting layer via the short-circuited receiving layer to the medium adjacent thereto if an electrical pulse generator with a suitably chosen pulse duration is connected to the electrodes of the transmitting layer. In the receiving phase following the transmitting phase the emitted acoustic wave is received by the receiving layer after reflection from the object to be investigated as a result of which an electrical output signal can be picked up at the electrodes thereof. In this receiving phase the transmitting layer is shortcircuited.

The known transducer works on the pulse echo principle in which there must always be a minimum time interval between transmitted pulse and received pulse. When said transducer is being used as a sensor, there must therefore be a minimum distance between the reflecting object and the sensor which corresponds to said time interval.

The object of the invention is to provide a sensor of the type mentioned in the introduction in which no lower limit is imposed on the distance between sensor and object.

This object is achieved according to the invention in that with a high acoustic impedance of the boundary medium adjacent to the transmitting layer and a low acoustic impedance of the boundary medium adjacent to the receiving layer or vice versa, the sum of the thicknesses of the transmitting and receiving layers is an odd number of v/4f, and with similar impedance, either low or high, of the said boundary media the sum is an even number of v/4f, where v is the propagation velocity of the acoustic vibration in the material of the transmitting and receiving layers and f is the frequency of the signal supplied. In this case reception can already take place during the transmission.

The boundary medium with a low acoustic impedance may, for example, be air. In a surprising manner it has been found that if an object is placed against a layer adjacent to the air, a change in the magnitude of the output signal occurs, which change may be used as a criterion for the presence of the said object.

When no object is present, a standing wave occurs in the sensor so that no energy is delivered from the sensor to the outside. If an object is indeed present, the standing-wave state is disturbed, as a result of which the said change in the output signal is produced.

Unexpectedly it also emerged that for some objects the change in the output signal was dependent on the force with which the object was pressed against the sensor, or on the temperature of the object. As a result of making use of the behaviour of these objects the sensor is not only suitable as a presence detector but also as a sensor sensitive to measured values.

It has been found that the measured-value dependence of the sensor is improved in that the outside of the transmitting or receiving layer is adjacent to a medium with a low or high, fixed acoustic impedance and that the receiving or transmitting layer respectively is provided at the outside with a measured-value impedance converter for determining a physical quantity.

An improved sensitivity is also achieved in that the outsides of the transmitting and receiving layers are provided with a measured-value impedance converter for determining a physical quantity.

A measured-value impedance converter for determining a physical quantity may also be present between transmitting and receiving layer.

In one embodiment the measured-value impedance converter consists of a coupling layer, the acoustic impedance of which is dependent on the value applicable for this layer of the respective physical quantity. Preferably, the coupling layer is manufactured from a porous or foamed material.

In another embodiment the measured-value impedance converter consists of a coupling layer, the coupling efficiency of which is dependent on the pressure exerted on the respective layer. This dependence is preferably achieved in that the inside face of the coupling layer is roughened or corrugated.

An optimum sensitivity of the sensor having a variable acoustic impedance of the boundary medium at the receiving side is achieved with a sensor thickness of $\frac{1}{4}\lambda$, $\frac{1}{2}\lambda$ or $\lambda$ of the acoustic wave if the thickness ratio of transmitting and receiving layers with a boundary medium at the transmitting layer having a high acoustic impedance is respectively very small, 1:1, 1:4 and 4:1, and with a boundary medium having a low acoustic impedance is respectively 1:1, 1:2, 2:1 and 1:1, and with a boundary medium with a relatively low acoustic impedance and a sensor thickness of $\frac{1}{2}\lambda$ or $\lambda$, the thickness ratio is respectively 2:3 and 1:1.

In yet another embodiment a common electrode is disposed between transmitting and receiving layer and parallel supply and pick-up electrode tracks respectively are present at the outsides of the transmitting and receiving layer, the supply electrode tracks and the pick-up electrode tracks crossing each other essentially perpendicularly, to which supply electrode tracks transmitted signals are supplied in sequence while a read-out device is present which reads out the pick-up electrode tracks.

It has emerged that this embodiment is particularly video-compatible.

In an elaboration of this embodiment a multiplexer is present via which the transmitted signals are derived from an electrical signal source.

In a further elaboration the read-out device is formed by a multiplexer.

In another further elaboration each pick-up electrode track is connected via a detector circuit to an integrator circuit which after each scanning cycle is reset, the outputs of the integrator circuits being read out in parallel.

For the purpose of a good matching between sensor and drive source on the one hand and scanning device on the other a tuning coil is connected in series with or parallel to the supply and/or pick-up electrode track.

The invention will be explained in more detail hereafter by reference to the drawings. In the drawings:

FIGS. 1 and 2 show respectively an embodiment of a $\lambda/4$ sensor according to the invention and the amplitude associated therewith of the acoustic standing wave in the sensor;

FIGS. 6 shows another embodiment of the invention.

FIG. 7 shows yet another embodiment of the sensor according to the invention;

Figure 3:
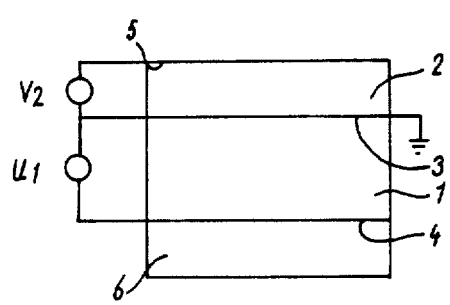
FIGS. 3, 4 and 5 show respectively a λ/2 sensor according to the invention, the amplitudes associated therewith of the acoustic standing wave and the frequency characteristics.

The sensor according to FIG. 1 consists of a transmitting layer 1 and a receiving layer 2 of piezoelectric material. Many piezoelectric materials have already been used. Preferably polyvinylidene fluoride (PVDF) with piezoelectric properties is used for the sensor because PVDF is durable and cheap and, in addition, can be constructed in a simple manner in this flexible layers. Between the transmitting and receiving layers there is a common electrode 3, which components are, for example, glued to each other. The outsides of the layers 1 and 2 are provided with a transmitting electrode 4 or receiving electrode 5 respectively, which can be applied by means of glueing, vapour deposition or another suitable method. An electrical signal source U1 is connected to the earthed common electrode 3 and the transmitting electrode 4, as a result of which a voltage V2 is produced across the common electrode 3 and the receiving electrode 5. The thickness d of the transmitting and receiving layers together and the frequency of the signal source are chosen in a manner such that a standing wave is generated in the sensor.

Depending on the media 6 and 7 respectively adjacent to the transmitting and receiving layers, various vibration modes of standing waves can occur. If a medium 6 or backing with an acoustic impedance which is high with respect to that of the material of the transmitting layer is adjacent to the outside of the transmitting layers, a node is produced at the boundary layer. A boundary medium 7 or fronting at the receiving layer 2 having a low acoustic impedance is attended by an antinode at the boundary layer of medium and receiving layer. For possible vibration modes of the standing waves in the sensor there is therefore the relationship $d = (2n+1)/4 \cdot v/f$ between the frequency f of the signal from the signal source U1 and the thickness d of the sensor, i.e. the thickness of the transmitting layer plus the thickness of the receiving layer. Here v is the propagation velocity of the acoustic vibration in the sensor, while n is a number 0, 1, 2, 3 ... The same applies to a low acoustic impedance at the outside of the transmitting layer and a high impedance at the outside of the receiving layer.

Inasmuch as $v/f = \lambda$, it is possible to speak of a ¼ λ vibrator for n=0 and a ¾ λ vibrator for n=1, etc.

If the boundary media 6 and 7 both have an acoustic impedance which is low with respect to the acoustic impedance of the sensor, antinodes are produced at the interfaces, while with two high acoustic impedances nodes are produced. For possible vibration modes the relationship $d = 2 \cdot n/4 \cdot v/f$ applies. Here n=1, 2, 3 ... In this case it is possible to speak of a λ/2 vibrator for n=1, a λ vibrator for n=2, etc.

In FIG. 1 an embodiment of a λ/4 sensor is shown. Brass, which, as is known, has a high acoustic impedance or is acoustically heavy, has been chosen as medium 6. The boundary medium 7 is formed by air. Air has a very low acoustic impedance (Z≈0) with respect to the material PVDF of the sensor. The curve of the standing wave is shown in FIG. 2.

It has been found that if an object is applied to the receiving layer, a voltage change is measured across the receiving electrode 5 and the common electrode 3. The device of FIG. 1 thus acts as a presence sensor. Unexpectedly it has emerged that by varying the pressing of some objects against the receiving layer a corresponding change in the voltage V2 is measured across the electrodes 3 and 5. Besides being used as a presence sensor, the sensor can also be used as a sensor which is sensitive to a measured value such as pressure, shearing forces and temperature of the object.

The ⅜ 80 sensor according to FIG. 3 comprises the transmitting layer, the receiving layer 2 and the backing 6. The thickness of the transmitting and receiving layers together is equal to ½ λ of the acoustic wave, in other words, $v/2f_w$, where v is the propagation velocity of the acoustic wave in the transmitting and receiving layers, while $f_w$ is the operating frequency or the frequency of the electrical signal source U1. The backing 6 has a relatively low acoustic impedance.

Figure 4:
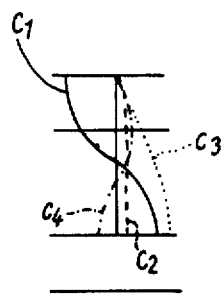
Figure 5:
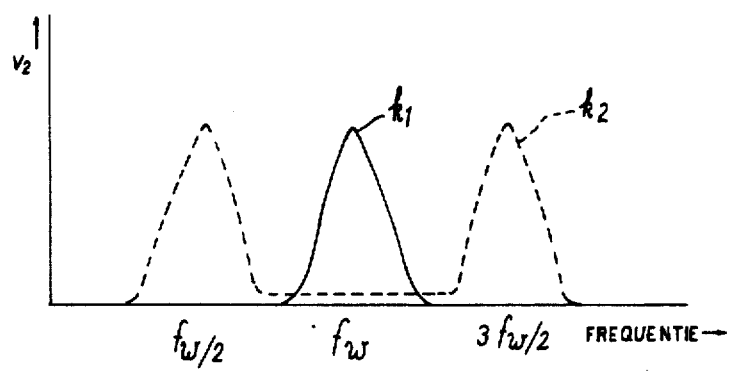

In the no-load state the sensor vibrates in the λ/2 mode. In said mode there occurs in the sensor an acoustic standing wave, the amplitude C1 of which is shown in FIG. 4. If the output voltage of the signal source U1 which is connected to the common electrode 3 and the transmitting electrode 4 is constant, the frequency characteristic k1 shown in FIG. 5 is obtained by varying the frequency of said source. Said frequency characteristic exhibits a resonance at the operating freqency $f_w$.

If an object which is heavy or has a high acoustic impedance is brought up against the receiving layer, a node occurs at the interface of the object and the respective layer 2. A sensor loaded in this way will exhibit the tendency to vibrate in the ¼ λ mode or the ¾ λ mode. The amplitude of the acoustic standing wave in the ¼ λ mode is indicated by C3 in FIG. 4, while the amplitude C4 shown in FIG. 4 occurs in the ¾ λ mode. The frequency characteristic k2 of the sensor in the loaded state is indicated by a broken line in FIG. 5.

During operation the sensor is driven at a constant frequency, the operating frequency $f_w$, so that in the loaded state the sensor cannot vibrate either in the ¼ λ mode or in the ¾ λ mode. From the frequency characteristic k2 in FIG. 5 it is evident incidentally that the ¾ λ mode is also not possible as a result of the said loading. The acoustic wave in the sensor therefore has the amplitude C2 shown in FIG. 4, with a very low voltage V2 across the receiving electrode 5 and the common electrode 3 as a result.

It has moreover emerged that the pressure sensitivity can be increased by using a pressure impedance converter which is adjacent to the outside of the transmitting or receiving layer. By exerting an external pressure on the converter the acoustic impedance thereof changes, as a result of which a corresponding change in the voltage V2 is measured across the electrodes 3 and 5.

In FIG. 6 an embodiment of a pressure-sensitive sensor is shown which again consists of the transmitting layer 1, the receiving layer 2, the common electrode 3, the transmitting electrode 4, the receiving electrode 5 and a boundary layer 6 which is in fact also termed the "backing". Moreover, on the outside of the receiving layer 2 there is disposed a pressure impedance converter 8. Said converter has the form of a layer for which a porous or foamed material such as, for example, porous rubber or foamed PVDF, is used as material. In this embodiment a porous rubber has been used as converter layer.

As a result of an external force or pressure being exerted on the porous rubber layer 8 the acoustic impedance of said layer will change. The consequence thereof is a readily measurable change in the voltage V2 across the electrodes 3 and 5.

Another type of pressure impedance converter is used in the touch sensor according to FIG. 7. Corresponding components are provided with the same reference numerals as in FIGS. 1 and 3. The surface 9 of the acoustic converter 8 is corrugated, while a roughened surface 9 also yields good results. As a result of an external force or pressure being exerted on the converter layer 9, depending on the magnitude of the force or pressure the corrugated or roughened surface becomes flatter so that the coupling coefficient is increased. In particular, the contact surface of the layer 8 with the receiving layer 2 becomes greater. Said change in the coupling coefficient may be regarded as a change in the acoustic impedance of the layer 8 and the air present between the layer 8 and receiving layer 2. As a result of this change in the acoustic impedance a readily measurable and reproducible change in the voltage V2 across the electrodes 3 and 5 is produced.

From the foregoing it follows that the occurrence of a standing wave is determined by the relation between the total thickness of the transmitting and receiving layers and the frequency of the signal supplied. Moreover, it has been found that for an optimum sensitivity when a variable acoustic impedance is coupled to the receiving side both the drive frequency and the thickness ratio of the transmitting and receiving layer have an influence. In particular it has been found that with a sensor thickness of $\frac{1}{4}$ v/f, $\frac{1}{3}$ v/f, $\frac{3}{8}$ v/f or v/f, the thickness ratio of the transmitting and receiving layers 1 and 2 respectively is preferably very small, 1:1, 1:4 or 4:1 respectively with a boundary medium at the transmitting layer having a high acoustic impedance. For a boundary medium with a low impedance the preferred ratios are 1:1, 1:2, 2:1 and 1:1 respectively. For a boundary medium with a relatively low impedance and a sensor thickness of $\frac{1}{2}$ v/f and v/f, the ratios are preferably 2:3 and 1:1.

The invention extends moreover to the following embodiments.

a. The heavy brass backing 6 of FIGS. 1, 6 and 7 has been replaced by air (Z≃0), as a result of which a node plane at the backing/PVDF interface is turned into an antinode plane. The standing wave then occurs in the so-called λ/2 mode with λ=2d at a twice higher frequency.

b. Replacement of the brass backing by a material with a relatively low value of Z, for example a plastic material also appears expedient, in which case the λ/2 mode is again used.

c. A pressure impedance converter is applied to both the transmitting and receiving layers 1 and 2 respectively.

d. Higher harmonics of both the $\frac{1}{4}$ λ and the $\frac{1}{2}$ λ vibration modes may occur at λ=4d/(2n+1) and λ=2d/n respectively (n being an integer which is greater than zero).

e. In order to ensure a good conductivity, a relatively thick intermediate electrode 3 is used in practical cases. The vibration behaviour of the sensor can be influenced by the choice of this thickness.

Figure 8:
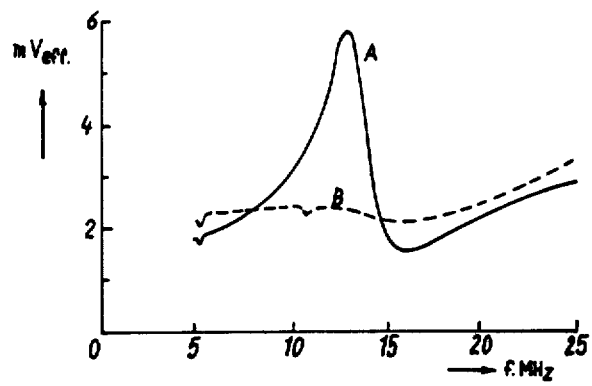
FIG. 8 shows frequency characteristics of the sensor according to the invention.

A sensor constructed from a PVC backing with a 2 mm-thick PVDF layer glued thereon, a piezoelectric PVDF transmitting layer having a thickness of 44 μm, a common electrode made of 25 μm thick steel foil and a piezoelectric PVDF receiving layer having a thickness of 51 μm and an aluminium electrode at the backing side of the transmitting layer and the top side of the receiving layer respectively is coupled to the receiving layer by means of a rubber layer. On driving the transmitting layer with a voltage of 600 mV and a variable frequency the response curve A of FIG. 8 was measured without coupling across the common electrode and the receiving electrode. The measured signal has a maximum of 6 mV at a frequency of 12.8 MHz. On pressing on the rubber layer the signal according to curve B of FIG. 8 was measured. It appeared, moreover, that at intermediate pressures between those which were used in the measurement of the curve A and that of the curve B the signal curves corresponding to these intermediate pressures lie between the curves A and B, the output signal appearing to be a function of the pressure exerted.

Figure 9:
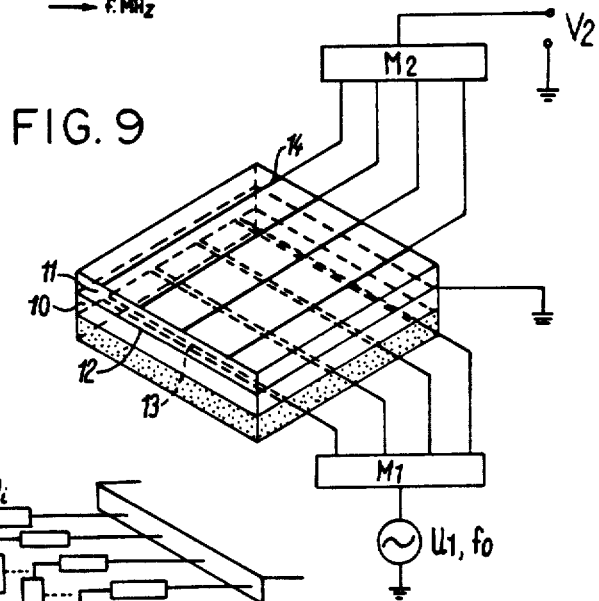
FIG. 9 shows an embodiment of a sensor array with series readout.

In the design of the sensor the video compatibility of the readout and data processing of a large number of elements was paramount. This can be achieved, for example, by means of the embodiment shown in FIG. 9.

Between the transmitting layer 10 and the receiving layer 11 there is a common electrode 12 which is externally earthed. At the bottom side of the transmitting layer 10 and the top side of the receiving layer 11 there are two sets of (parallel) narrow line electrodes 13 and 14 respectively which cross each other perpendicularly. The crossover points may be regarded as sensor elements.

The two sets of transmitting and receiving electrodes 13 and 14 respectively are connected to multiplexers M1 and M2 respectively. An electrical signal source U1 is connected to the input of the multiplexer M1, while the receiving electrodes 14 are read out by means of the multiplexer M2. The fronting which is located at the top side of the receiving layer 11 has not been drawn here for the sake of clarity. Said fronting may be air or a layer having an acoustic impedance which is a function of the external pressure or force exerted thereon.

The multiplexer M1 drives the transmitting electrodes 13 in sequence with a predetermined delay time, after which all the receiving electrodes 14 are read out in sequence by the multiplexer M2.

For the calculation of the relationship between the required operating frequency of the transmitter $f_O$ with the available number of receiving electrodes N, use can be made of the relationship:

$$L = N \cdot \tau = N \cdot a/f_O \qquad (1)$$

where $\tau$ is the measuring time per receiving electrode, i.e. a is the number of vibration cycles necessary for an adequate detection. $L = 1/f_L$ is the standard TV line time ($\simeq 60$ μs). From the equation (1) it follows that:

$$f_O = N \cdot a/L \qquad (2)$$

For a preselected value of L this relationship offers a considerable freedom in dimensioning the sensor.

For the chosen values: a=10, N=60 and $f_L$=16 kHz (L≈60 μs), the required drive frequency is $f_0$=10 MHz.

With constant a and L, for a larger number of receiving electrodes N the required drive frequency is larger, which requires, however, for the standing-wave state a smaller total thickness of transmitting layer plus receiving layer. This offers the advantage that more closely spaced receiving electrodes are accompanied by a smaller sensor thickness, which limits the increasing chance of cross-talk between adjacent lines through the transmitter. This is the result of the fact that the transmitting electrodes and the receiving elecrodes are closer together, as a result of which the edge effects play a smaller part and less spreading of the field lines occurs.

The maximum number of receiving electrodes on the transmitting layer is limited to N=625, corresponding to the resolution of a standard TV. In this case, with a=10, an $f_O$ of 100 MHz is calculated, which can be achieved with a sensor which is ten times as thin as the example given with N=60. Obviously, for a given N, the number of cycles a can be decreased or increased, which results in a lower or higher $f_O$ respectively.

Figure 10:
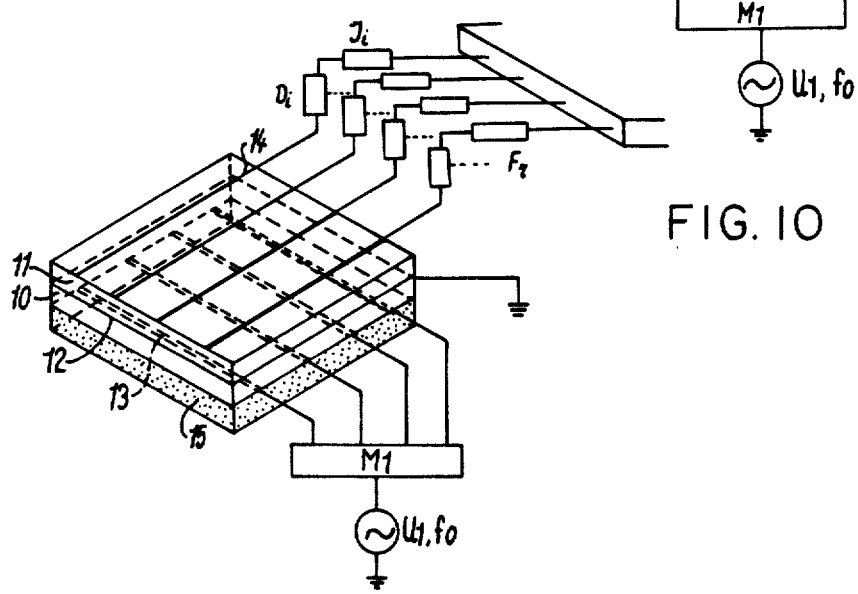
FIG. 10 shows an embodiment of a sensor array with parallel readout.

An increase in the number of cycles a can be achieved by using a parallel read-out of the receiving electrodes instead of the serial read-out described above, an embodiment of which is shown in FIG. 10. Corresponding components are provided with the same reference numberals as in FIG. 9.

The signals on the receiving electrodes 14 are supplied via detector circuits Di to the integrator circuits Ii in which the detected signals are integrated. The output signals $U_i$ from the integrator circuits Ii can be picked up simultaneously, after which all the integrator circuits are reset in as short a switching time t as possible. The read-out time per driven transmitting electrode then becomes $$a/f_O = L - t \quad (3)$$

For the detection of 10 cycles it is then possible to operate even at a frequency of 600 kHz.

As detector circuit Di a phase-sensitive detector can be used with an input Fr, drawn with a dotted line, for a reference phase. In the simplest form the detector circuit and the integrator circuit can be constructed as a series circuit of a diode and a capacitor, the connection points being read out in parallel.

A problem which cannot remain undiscussed is the disadvantageous influence of the long read-out electrodes on the voltage level of the receiver. In particular, the charge is generated in a small element at the point where a transmitting and receiving electrode cross. A solution to this can be found through inductive compensation for these parasitic capacities by means of tuning selfinductances which are connected in series with the transmitting and/or receiving electrodes 13 and 14 respectively, or by means of a parallel connection thereof between the respective electrodes and earth.

Incidental advantages of the invention are a very short response time (40 msec per frame) and a low hysteresis, while the sensor is insensitive to low frequency interference signals.

The sensor according to the invention has interesting applications in automation technology. For example, by equipping a robot with this sensor, the robot is, as it were, provided with a tactile-sense tool. When fitted in the gripper, the following tasks, inter alia, can be performed.

The determination of the presence of an object in the gripper.

The determination of the position and orientation in the gripper.

The recognition of the object (on the basis of the impression in the gripper or on the basis of the texture of the object).

Slip detection.

The measurement of pinching forces.

The measurement of the temperature of an object.

In most cases the response of the sensor has direct consequences for the robot control; a form of feed-back takes place.

Outside of automation, the tactile sensor has some applications in rehabilitation, for example in prostheses. The tactile sensor can also be used, for example, to determine the pressure pattern of a foot imprint, optionally as a function of time.

The application of the tactile sensor according to the invention also extends to the measurement of timedependent pressure distributions in granular liquid and gas streams.

We claim:

1. Sensor comprising a transmitting layer and a receiving layer located thereon of piezoelectric material, which are provided with electrodes for supplying and deriving electrical signals to said transmitting layer or from said receiving layer respectively, wherein in order to obtain a standing wave in a unit of transmitting and receiving layer, a sum of the thicknesses of said transmitting and receiving layers is selected such that with a high acoustic impedance of a boundary medium adjacent to said transmitting layer and a low acoustic impedance of a boundary medium adjacent to said receiving layer or vice versa, said sum is an odd number of v/4f, and with similar impedances, either low or high, of the said boundary media said sum is an even number of v/4f, where v is a propagation velocity of acoustic vibration in a material of said transmitting and receiving layers and f is a frequency of a signal supplied and wherein said receiving layer detects a change of a resonance mode or resonance frequency of said sensor as a unit, said change being produced by a change of environmental conditions of said sensor and on its turn producing a change of sensed amplitude.

2. Sensor according to claim 1, wherein an outside of said transmitting or receiving layer is adjacent to a medium with a low or high fixed acoustic impedance and that said receiving or transmitting layer respectively is provided at the outside with a layer having a variable acoustic impedance, a variation of which is dependent on a physical quantity to be sensed.

3. Sensor according to claim 1, wherein outsides of said transmitting and receiving layers are provided with a layer having a variable acoustic impedance, a variation of which is dependent on a physical quantity to be sensed.

4. Sensor according to claim 3, wherein said layer having a variable acoustic impedance, comprises a porous or foamed material.

5. Sensor according to claim 1, wherein an outside of said transmitting or receiving layer is adjacent to a medium with a low or high fixed acoustic impedance and that said receiving or transmitting layer respectively is provided at the outside with a layer that couples acoustically to an object with variable efficiency, a variation of which is dependent on a physical quantity to be sensed.

6. Sensor according to claim 1, wherein outsides of said transmitting and receiving layers are provided with layers which coupled acoustically to a respective object and support with variable efficiency which variation is dependent on a physical quantity to be sensed.

7. Sensor according to claim 6, wherein an inside face of the layer having a variable coupling efficiency is roughened or corrugated.

8. Sensor according to claim 1, wherein with a variable acoustic impedance of the boundary medium at a receiving side and a sensor thickness of $\frac{1}{4}\lambda$, $\frac{1}{2}\lambda$, $\frac{3}{4}\lambda$, or $\lambda$ of an acoustic wave, thickness ratio of transmitting and receiving layers with a high acoustic impedance of the boundary medium at said transmitting layer is respectively very small, 1:1, 1:4 and 4:1 and with a low acoustic impedance of the boundary medium it is respectively 1:1, 1:2, 2:1 and 1:1 and with said boundary medium with a relatively low acoustic impedance and a sensor thickness of $\frac{1}{2}\lambda$ or $\lambda$, thickness ratio is respectively 2:3 and 1:1.

9. Sensor comprising superposed transmitting and receiving layers and a common electrode located between said transmitting and receiving layers, wherein other surfaces of said transmitting and receiving layers are provided with input electrode tracks and output electrode tracks respectively, said input electrode tracks extending parallel to each other and said output electrode tracks extending parallel to each other and perpendicular to the input electrode tracks, in which transmitted signals are supplied in sequence to said input electrode tracks and in which said output electrode tracks are connected to a read-out device.

10. Sensor according to claim 9, wherein a multiplexer is present via which said transmitted signals are derived from an electrical signal source.

11. Sensor according to claim 9, wherein said read-out device is formed by a multiplexer.

12. Sensor according to claim 9, wherein each output electrode track is connected via a detector circuit to an integrator circuit being reset after each scanning cycle, and wherein outputs of the integrator circuits are read out in parallel.

13. Sensor according to claim 9, wherein a tuning coil is connected in series to said input electrode tracks and/or to said output electrode tracks.

14. Sensor according to claim 9, wherein a tuning coil is connected in parallel to said input electrode tracks and/or to said output electrode tracks.

* * * * *

UNITED STATES PATENT AND TRADEMARK OFFICE
CERTIFICATE OF CORRECTION

PATENT NO. : 4,712,037
DATED : December 8, 1987
INVENTOR(S) : Verbeek et al.

It is certified that error appears in the above-identified patent and that said Letters Patent is hereby corrected as shown below:

First page, Item 75, "Theodorus A. Klaase" should read --Petrus T. A. Klaase--;
Column 4, line 19, "1/2 80" should read --1/2 $\lambda$ --; and
Column 4, line 51, "3/4" should read --1/2--.

Signed and Sealed this

Twenty-eighth Day of June, 1988

Attest:

DONALD J. QUIGG

*Attesting Officer*     *Commissioner of Patents and Trademarks*